US011630182B2

(12) United States Patent
Lin et al.

(10) Patent No.: US 11,630,182 B2
(45) Date of Patent: Apr. 18, 2023

(54) SYSTEM AND METHOD FOR ESTABLISHING RELATIVE DISTANCE AND POSITION OF A TRANSMITTING ANTENNA

(71) Applicant: Nanning FuLian FuGui Precision Industrial Co., Ltd., Nanning (CN)

(72) Inventors: Wen-Jen Lin, New Taipei (TW); Ming-Chieh Cheng, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 81 days.

(21) Appl. No.: 17/366,382

(22) Filed: Jul. 2, 2021

(65) Prior Publication Data
US 2021/0333355 A1    Oct. 28, 2021

Related U.S. Application Data

(63) Continuation of application No. 16/412,826, filed on May 15, 2019, now Pat. No. 11,112,484.

(51) Int. Cl.
*G01S 5/04* (2006.01)
*G01S 11/06* (2006.01)

(52) U.S. Cl.
CPC ............... *G01S 5/04* (2013.01); *G01S 11/06* (2013.01)

(58) Field of Classification Search
CPC ..................................... G01S 5/04; G01S 11/06
USPC ........................................................... 342/451
See application file for complete search history.

(56) References Cited

FOREIGN PATENT DOCUMENTS

CN         109407079 A  *  3/2019   ............. G01S 11/06

* cited by examiner

*Primary Examiner* — Harry K Liu
(74) *Attorney, Agent, or Firm* — ScienBiziP, P.C.

(57) ABSTRACT

A system and method for a second wireless device to establish distance and location of a first device which is transmitting radio waves includes the first and second devices. Each second device includes two or more (N in number) receiving antennas. An angle between the directions in which adjacent receiving antennas receive the strongest signals is 360°/N. The second device obtains a received signal strength indicator (RSSI) of each receiving antenna receiving signals from the first device, and from the two strongest receiving antennas, calculation of an angle between the first device and one of the adjacent receiving antennas can be performed. The distance between the first device and the second device can also be calculated.

14 Claims, 4 Drawing Sheets

SYSTEM AND METHOD FOR ESTABLISHING RELATIVE DISTANCE AND POSITION OF A TRANSMITTING ANTENNA

CROSS REFERENCE TO RELATED APPLICATIONS

This application is a Continuation of pending U.S. patent application Ser. No. 16/412,826, filed on May 15, 2019 and entitled "SYSTEM AND METHOD FOR ESTABLISHING RELATIVE DISTANCE AND POSITION OF A TRANSMITTING ANTENNA", the contents of which are incorporated by reference herein.

FIELD

The subject matter herein generally relates to wireless communications.

BACKGROUND

Most methods require multiple nodes or devices in a particular placement, this is costly and difficult to apply to ordinary home environments. In addition, WIFI access points and Internet of Things (IOT) mostly use dipole antennas to transmit and receive signals, and then position by means of beam forming. However, such positioning methods are susceptible to environmental interference and negatively affect positioning accuracy.

Therefore, there is room for improvement within the art.

BRIEF DESCRIPTION OF THE DRAWINGS

Implementations of the present disclosure will now be described, by way of embodiment, with reference to the attached figures.

DETAILED DESCRIPTION

Figure 1:
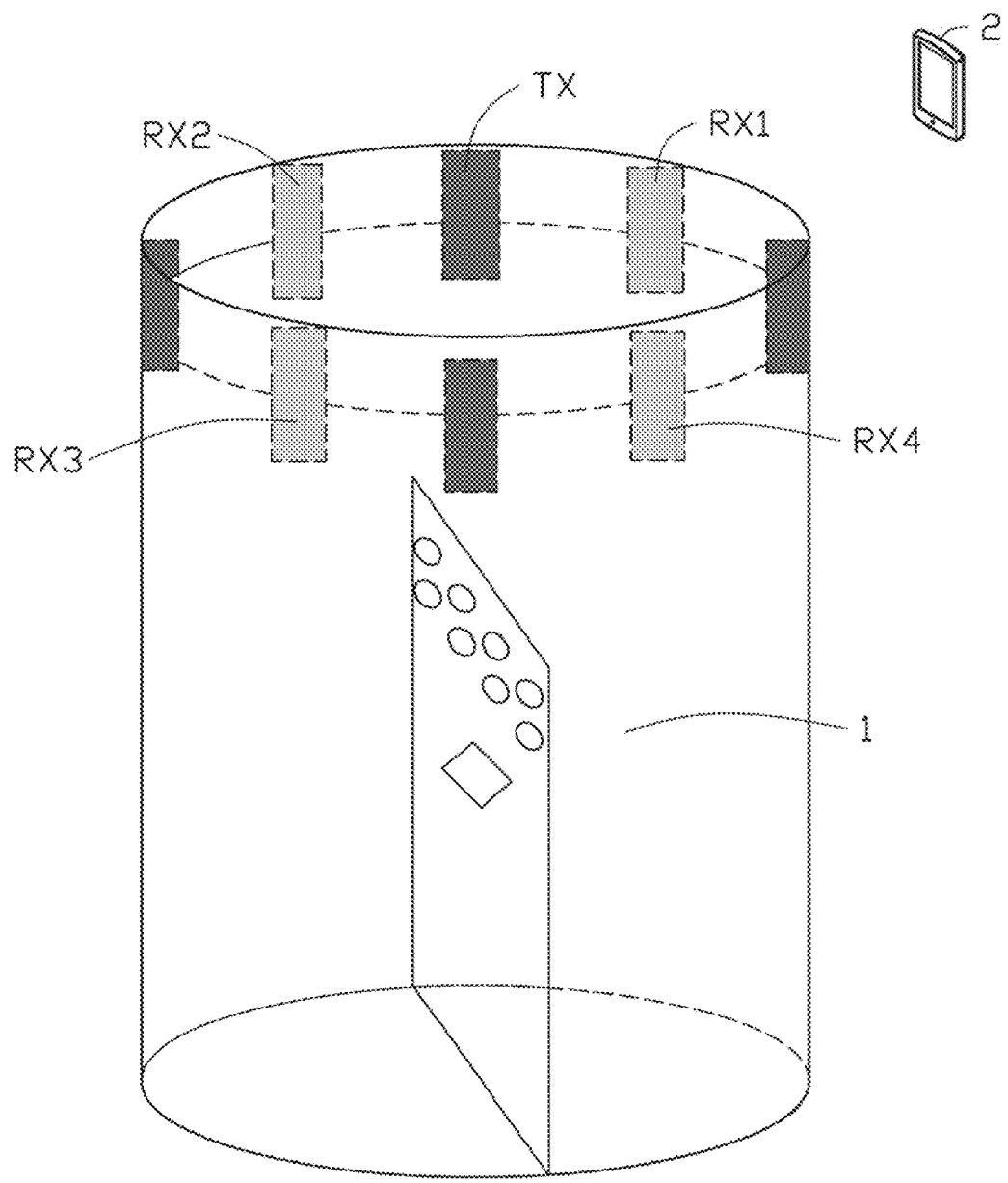
FIG. 1 is a system architecture of one embodiment of a positioning system for antennas used indoors.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series, and the like.

The present disclosure is described in relation to a positioning system and method for antennas.

FIG. 1 shows a system architecture of one embodiment of a positioning system. The positioning system includes a first device 1 and a plurality of second devices 2. The system architecture can be implemented in a building such as a shopping mall, a factory, a hospital, a hotel, a restaurant, an airport, and the like. The first device 1 can determine the position of each second device 2. In this embodiment, the first device 1 determining the position of one second device 2 is taken as an example for description.

In this embodiment, the first device 1 can be a router or other access point. The plurality of second devices 2 can be wireless communication devices having a transceiving function. In this embodiment, the second device 2 and the first device 1 may also be wirelessly connected. The wireless communication protocols include, but are not limited to, for example, WIFI and ZIGBEE.

The first device 1 comprises a plurality of transmitting antennas (transmitting antenna TX) and at least two receiving antennas. In this embodiment, each transmitting antenna TX is a dipole antenna with a gain of less than 6 dB, and each receiving antenna is a directional antenna. In this embodiment, four receiving antennas of the first device 1 are taken as an example for description. The four receiving antennas includes a first receiving antenna RX1, a second receiving antenna RX2, a third receiving antenna RX3, and a fourth receiving antenna RX4. A number of the transmitting antennas TX is also four. The four receiving antennas and four transmitting antennas are evenly and alternately arranged. In the positioning system of the present disclosure, after separately arranging the transmitting antennas TX and the receiving antennas, the directional antennas are used as the receiving antennas, and a beam forming to improve online communication quality can be used to communicate with the second device 2.

Figure 2:
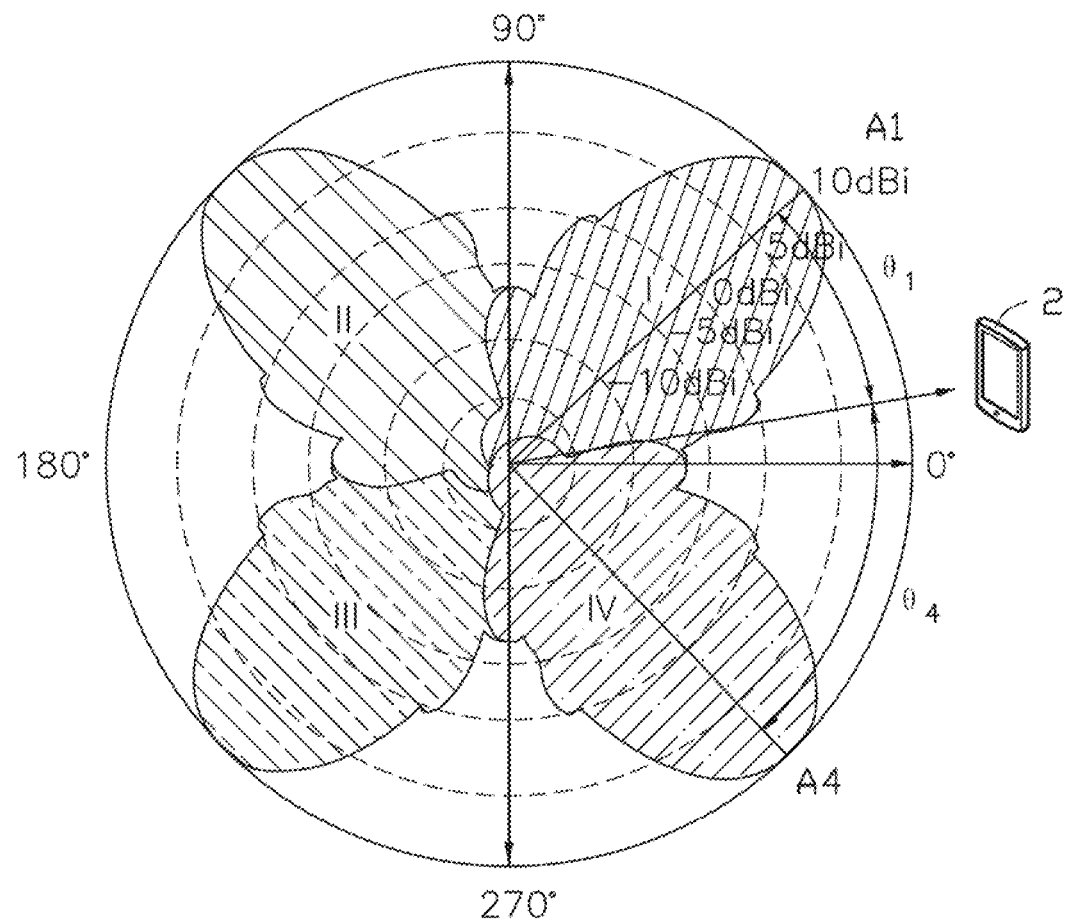
FIG. 2 is a schematic view of signals of antennas of the positioning system of FIG. 1.

Referring to FIG. 2, each receiving antenna has a direction in which intensity of a received signal is strongest. For example, the direction in which the first receiving antenna RX1 receives a strongest signal is A1, and the direction in which the fourth receiving antenna RX4 receives a strongest signal is A4. An angle θ between the directions in which adjacent receiving antennas receive the strongest signals is the same, that is 360°/N. In 360°/N, N is the number of receiving antennas RX. In an embodiment, the number of the receiving antennas RX is four (i.e. N=4), therefore θ=90°. Thus, the angle θ between the directions A1 and A4, the directions in which the first receiving antenna RX1 and the fourth receiving antenna RX4 receive the strongest signals, is 90°. In other embodiments, N may be equal to 2, 3, 5-10, etc. One skilled in the art can arrange a suitable number of receiving antennas RX according to hardware requirements and space around a device. In this embodiment, a space in which the first device 1 is located may be divided into four quadrants according to the intensities of the received signals of the four receiving antennas RX. The four quadrants are a first quadrant RXQ-I, a second quadrant RXQ-II, a third quadrant RXQ-III, and a fourth quadrant RXQ-IV. Each quadrant is a region where a certain receiving antenna RX receives stronger signals than do other receiving antennas RX.

Figure 3:
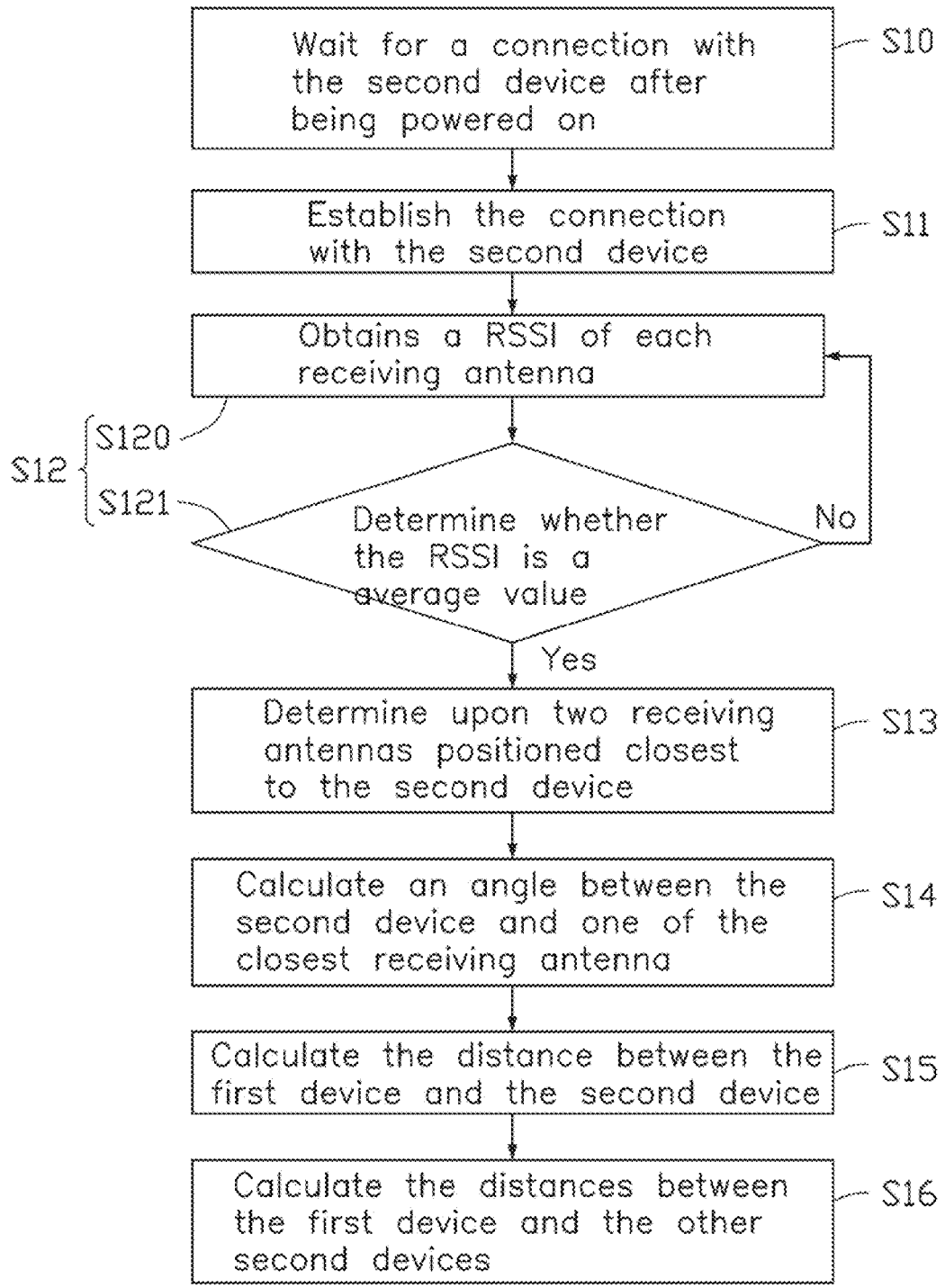
FIG. 3 is a flow chart of one embodiment of a positioning method for antennas used indoors.

FIG. 3 is a flow chart of an embodiment of a positioning method. The positioning method includes the following steps:

Block S10, the first device 1 waits for a connection with the second device 2 after being powered on.

Block S11, the first device 1 establishes the connection with the second device 2, and receives signals transmitted by the second device 2.

Block S12, the first device 1 obtains a received signal strength indicator (RSSI) of each receiving antenna receiving signals from the second device 2. For example, in this embodiment, the RSSI of the first receiving antenna RX1 is $AntI_{RSSI}$, d the RSSI of the fourth receiving antenna RX4 is $AntIV_{RSSI}$. In this embodiment, the first device 1 uses time division multiplexing to calculate the RSSI of each receiving antenna from the second device 2, even if the first device 1 has only one feeding point. The positioning system can still achieve the same positioning effect by using the time division multiplexing way.

In this embodiment, the Block S11 includes the following sub-steps:

Block S120, according to the obtained RSSI, an average value of the RSSI being received a preset number of times in respect of each receiving antenna receiving signals from the second device 2 (for example, last five signals received) is used as the RSSI of each receiving antenna.

Block S121, the first device 1 determines whether the RSSI of each receiving antenna remains equal to the average value of the RSSI. If the RSSI of each receiving antenna is equal to the average value, the process returns to block S110, but if the RSSI of each receiving antenna RX is not the average value, the process goes to block S13.

Block S13, the first device 1 determines upon two receiving antennas positioned closest to the second device 2. In this embodiment, the first device 1 selects two receiving antennas of maximum RSSI, and determines a position of the second device 2 relative to the first device 1, according to the two maximum RSSIs. For example, if the RSSIs of the first receiving antenna RX1 and the fourth receiving antenna RX4 are the two maximum RSSIs, the first device 1 determines that the first receiving antenna RX1 and the fourth receiving antenna RX4 are closest to the second device 2, and that the second device 2 is located in the first quadrant RXQ-I between the first receiving antenna RX1 and the fourth receiving antenna RX4.

Block S14, the first device 1 calculates an angle between the second device 2 and one of the closest receiving antennas. In this embodiment, angle θ1 between the second device 2 and the first receiving antenna RX1 and angle θ4 between the second device 2 and the fourth receiving antenna RX4 are calculated.

Figure 4:
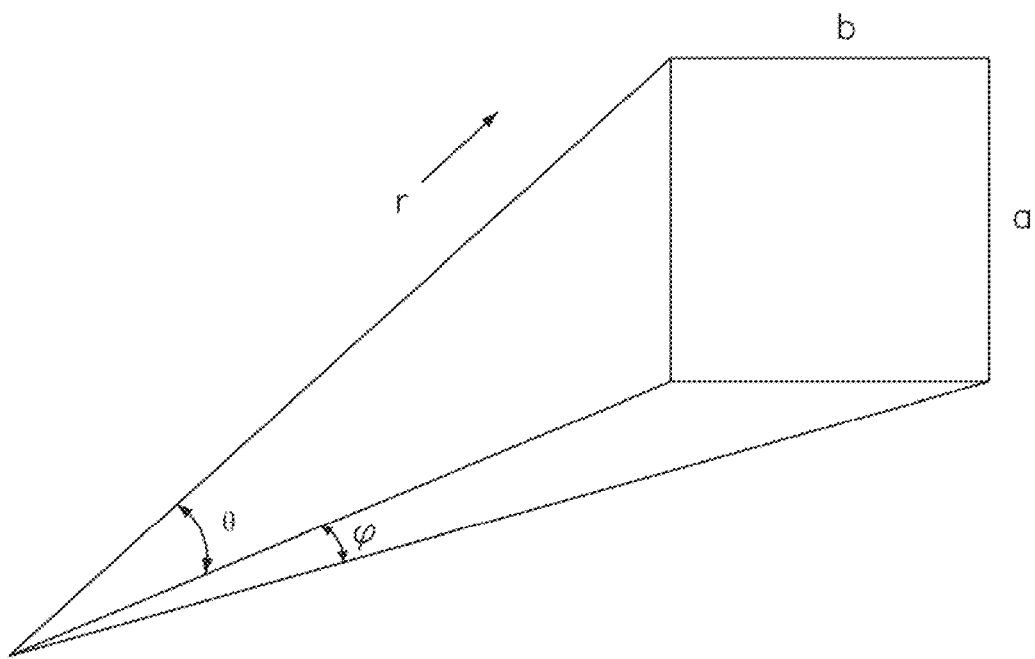
FIG. 4 is schematic view of a pattern of one of the receiving antennas of the positioning system of FIG. 1.

Referring to FIG. 4, in this embodiment, assuming that pattern of the receiving antennas is uniform, a gain Gt of the receiving antenna can be calculated by the following formula, $$Gt = \frac{AS}{AAP},$$

wherein, AS represents a circular area, and AAP represents a sector (a cross-section) of that area.

A model of the receiving antenna RX is substantially a rectangular area, and a long side a and a short side b of the rectangular area are calculated by the formulas $a=\gamma \sin \theta$ and $b=\gamma \sin \varphi$. Thus, the cross-sectional area AAP is equal to $\gamma^2 \sin \theta \sin \varphi$. The gain Gt of the receiving antenna can be calculated by the formula $$Gt = \frac{AS}{AAP} = \frac{4\pi\gamma^2}{\gamma^2 \sin\theta\sin\varphi} = \frac{4\pi}{\sin\theta\sin\varphi}.$$

In addition, assuming that the cross-sectional area is square, θ×φ substantially. Thus, the gain Gt of the receiving antenna RX can be further calculated by the formula $$G(t) = \frac{4\pi}{\sin^2\theta}.$$

Since the first quadrant RXQ-I and the second quadrant RXQ-IV are perpendicular to each other, it can be considered that θ4=90°−θ1. Thus, the gains of the first receiving antenna RX1 and the fourth receiving antenna RX4 can be respectively indicated by the formulas $$Gt1(dB) = 10\log\left(\frac{4\pi}{\sin^2\theta 1}\right) \text{ and } Gt4(dB) = 10\log\left(\frac{4\pi}{\cos^2\theta 1}\right).$$

Substituting $$Gt1(dB) = 10\log\left(\frac{4\pi}{\sin^2\theta 1}\right) \text{ and } Gt4(dB) = 10\log\left(\frac{4\pi}{\cos^2\theta 1}\right)$$

into the signal intensity formula of the receiving antennas, $AntI_{RSSI}=Pt+Gt(\theta)+Gr+20 \log \lambda-20 \log d$, wherein, Pt represents an output power of the second device 2, Gr represents a gain of the transmitting antenna, d represents a distance between the second device 2 and the first device 1, λ represents a wavelength. The formula $$AntI_{RSSI} - AntIV_{RSSI} = Gt1(dB) - Gt4(dB) = 10\log\left(\frac{\cos^2\theta 1}{\sin^2\theta 1}\right)$$

can be obtained.

It can be further obtained that $$\theta 1 = \frac{1}{2}\cos^{-1}\left(\frac{1}{\ln\left(\frac{AntI_{RSSI} - AntIV_R}{10}\right)+1} - 1\right).$$

The angle θ1 between the second device 2 and the first receiving antenna RX1 can thus be calculated.

Block S14, the first device 1 calculates the distance between the second device 2 and the first device 1.

In this embodiment, the gain Gt1 (dB) of the first receiving antenna RX1 is calculated according to the formula $$Gt1(dB) = 10\log\left(\frac{4\pi}{\sin^2\theta 1}\right).$$

According to the formula AntI$_{Rssi}$=Pt+Gt(θ)+Gr+20 log λ−20 log d, the formula $$d = \frac{1}{20} ln(AntI_{RSSI} + Pt + Gt(\theta) + Gr + 20 log\lambda)$$

can be derived. Since Pt, Gr, and 20 log λ can be known according to product information of the first device 1 and the second device 2, the distance d between the first devices 1 and the second device 2 can be calculated thereby achieving the position of the second device 2.

In other embodiment, the positioning system can include multiple second devices 2, the positioning method further includes:

Block S15, the first device 1 identifies the second device 2 according to physical information of the second device 2, such as a MAC address, and determines respective positions of second devices 2 according to the method described in blocks S10 to S14.

In other embodiment, when the number of the receiving antennas is N, the angle between the directions of the strongest received signals between adjacent receiving antennas is 360°/N (i.e.

$$\theta 4 = \frac{360°}{N} - \theta 1).$$

Substituting $$\theta 4 = \frac{360°}{N} - \theta 1$$

into the formulas in blocks S14, the formula $$AntI_{RSSI} - AntIV_{RSSI} =$$

$$Gt1(dB) - Gt4(dB) = 10log\left(\frac{4\pi}{sin^2\theta 1}\right) - 10log\left(\frac{4\pi}{sin^2\left(\frac{360°}{N} - \theta 1\right)}\right)$$

is obtained to calculate the angle θ1 between the second device 2 and the first receiving antenna RX1. Furthermore, combining with the formula AntI$_{Rssi}$=Pt+Gt(θ)+Gr+20 log λ−20 log d, the distance d between the second device 2 and the first device 1 can be calculated.

Therefore, if the number of receiving antennas is increased, the positions of all second devices 2 can be determined more accurately using the positioning method of the present disclosure. Receiving antennas with different antenna gains and different positioning angles can be established once the positioning angles satisfy the above condition (i.e. the angle between the directions of the strongest received signals between adjacent receiving antennas is 360°/N).

The positioning system and method of the present disclosure calculates the angle between the second device 2 and one receiving antenna, and calculates the distance between the first device 1 and the second device 2 according to such angle. The position of a second device 2 can thus be determined by the receiving antennas. The present disclosure only needs one first device 1 and the positioning method as the core architecture of the entire positioning system, and does not require additional cost to achieve positioning. The system architecture is simple and the cost is low. Meanwhile, the positioning process is not subject to significant interference, and the positioning accuracy is high.

In other embodiment, the positioning system and method of the present invention can be used in indoor or outdoor models to improve the accuracy of distance estimation.

In other embodiment, the positioning system of the present invention can be widely applied to a single antenna communication device, for example, BLUETOOTH, wireless personal area network (ZIGBEE), and Internet of Things (IOT), thereby more quickly determining a position or a distance of an object to be tested (i.e. the second device 2). This can be for practical applications such as a smoke detection and a sensor failure detection, in an industrial or domestic environment. For example, when the positioning system is applied in the case of the smoke detection or the sensor failure detection, the second device 2 being positioned in the monitoring area, a smoke or sensor failure triggers the corresponding second device 2 to establish a communication with the first device 1. The positioning method can be used to determine the position of the second device 2. Thus, an accident or a place where the failure occurs can be found rapidly, and effective measures can be taken.

The embodiments shown and described above are only examples. Many details are often found in the art such as the other features of the antenna structure and the wireless communication device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A positioning system comprising:
   a first device comprising two receiving antennas, wherein a number of the at least two receiving antennas is defined as N, an angle between the directions in which adjacent two of the receiving antennas receive the strongest signals is 360°/N; and
   a second device having a transceiving function, wherein the first device obtains received signal strength indicators (RSSI) of the receiving antennas, determines which of the two receiving antennas is closest to the second device according to the received signal strength indicators (RSSI), calculates an angle between the second device and the closest receiving antennas according to the received signal strength indicators (RSSI), and obtains a distance between the second device and the first device according to the angle and a gain of one of the closest receiving antennas,
   wherein the first device further calculates the angle between the second device and the closest receiving antennas according to a formula as follows:

$$AntI_{RSSI} - AntIV_{RSSI} = 10log\left(\frac{4\pi}{sin^2\theta 1}\right) - 10log\left(\frac{4\pi}{sin^2\left(\frac{360°}{N} - \theta 1\right)}\right),$$

wherein, θ1 represents the angle between the second device and the closest receivings antenna, $AntI_{RSSI}$ and $AntIV_{RSSI}$ represents RSSIs of the two closest receiving antennas.

2. The positioning system of claim 1, wherein the first device calculates the gain of one of the closest receiving antennas according to a formula as follows:

$$Gt1(dB) = 10\log\left(\frac{4\pi}{\sin^2\theta 1}\right),$$

wherein Gt1(θ1) represents the gain of the closest receiving antennas, the first device further calculates the distance between the second device and the first device according to a following formula $$d1 = \frac{1}{20}\ln(AntI_{RSSI} + Pt + Gt(\theta 1) + Gr + 20\log\lambda),$$

wherein Pt represents an output power of the second device, Gr represents a gain of a transmitting antennas and λ represents a wavelength.

3. The positioning system of claim 2, wherein the first device obtains a preset number of RSSIs of each of the receiving antennas, and uses an average value of the RSSIs as the RSSI of each of the receiving antennas.

4. The positionings system of claim 1, wherein the first device identifies the second device according to physical information of the second device and the physical information is a Media Access Control (MAC) address.

5. The positioning system of claim 1, wherein N is equal to four, an angle between the directions of the strongest received signals between adjacent receiving antennas is 90°, the first device calculates the angle between the second device and the closest receiving antennas according to a formula as follows:

$$\theta 1 = \frac{1}{2}\cos^{-1}\left(\frac{1}{\ln\left(\frac{AntI_{RSSI} - AntIV_{RSSI}}{10}\right)+1} - 1\right),$$

wherein, θ1 represents the angle between the second device and the closest receiving antennas, $AntI_{RSSI}$ and $AntIV_{RSSI}$ represents RSSIs of the two closest receiving antennas.

6. A positioning method, applicable in a first device to determine a distance between a the first device and a second device, the first device comprising at least two receiving antennas, a number of the receiving antennas is defined as N, an angle between the directions in which adjacent two of the receiving antennas receive the strongest signals is 360°/N, the second device having a transceiving function, the positioning method comprising:

(a) establishing a connection between the first device and the second device, obtaining a preset number of RSSIs of the receiving antenna, and using an average value of the RSSIs as the RSSI of the receiving antenna;

(b) obtaining received signal strength indicators (RSSI) of the receiving antennas received signals from the second device;

(c) determining which of the two receiving antennas is positioned closest to the second device according to received signal strength indicators (RSSI); and (d) obtaining an angle between the second device and the closest receiving antennas according to the received signal strength indicators (RSSI), and calculating a distance between the second device and the first device according to the angle and a gain of one of the closest receiving antennas.

7. The positioning method of claim 6, wherein the step (d) comprises:

calculating the angle between the second device and the closest receiving antennas according to a formula as follows:

$$AntI_{RSSI} - AntIV_{RSSI} = 10\log\left(\frac{4\pi}{\sin^2\theta 1}\right) - 10\log\left(\frac{4\pi}{\sin^2\left(\frac{360°}{N} - \theta 1\right)}\right),$$

wherein, θ1 represents the angle between the second device and the closest receiving antennas, $AntI_{RSSI}$ and $AntIV_{RSSI}$ represents RSSIs of the two closest receiving antennas.

8. The positioning method of claim 7, wherein the step (d) comprises:

calculating a gain of one of the closest receiving antennas according to a formula as follows:

$$Gt1(dB) = 10\log\left(\frac{4\pi}{\sin^2\theta 1}\right),$$

wherein Gt1(θ1) represents the gain of one of the closest receiving antennas;

calculating a distance between the second device and the first device according to a formula as follows:

$$d1 = \frac{1}{20}\ln(AntI_{RSSI} + Pt + Gt(\theta 1) + Gr + 20\log\lambda),$$

wherein Pt represents an output power of the second device, Gr represents a gain of a transmitting antenna, and λ represents a wavelength.

9. The positioning method of claim 6, further comprising:
identifying the second device according to physical information of the second device, wherein the physical information is a Media Access Control (MAC) address.

10. The positioning method of claim 6, wherein N is equal to four, an angle between the directions of the strongest received signals between the adjacent receiving antennas is 90°, the step (a) comprises:

calculating the angle between the second device and the closest receiving antenna according to a formula as follows:

$$\theta 1 = \frac{1}{2}\cos^{-1}\left(\frac{1}{\ln\left(\frac{AntI_{RSSI} - AntIV_{RSSI}}{10}\right)+1} - 1\right),$$

wherein, θ1 represents the angle between the second device and the closest receiving antennas, $AntI_{RSSI}$ and $AntIV_{RSSI}$ represents RSSIs of the two closest receiving antennas.

11. A positioning system comprising:

a first device comprising two receiving antennas, wherein a number of the at least two receiving antennas is defined as N; and a second device having a transceiving function, wherein the first device obtains received signal strength indicators (RSSI) of the receiving antennas, determines which of the two receiving antennas is closest to the second device according to the received signal strength indicators (RSSI), calculates an angle between the second device and the closest receiving antennas according to the received signal strength indicators (RSSI), and obtains a distance between the second device and the first device according to the angle, wherein N is equal to four, an angle between the directions of the strongest received signals between adjacent receiving antennas is 90°, the first device calculates the angle between the second device and the closest receiving antennas according to a formula as follows:

$$\theta 1 = \frac{1}{2}\cos^{-1}\left(\frac{1}{\ln\left(\frac{AntI_{RSSI} - AntIV_{RSSI}}{10}\right)+1} - 1\right),$$

wherein, θ1 represents the angle between the second device and the closest receiving antennas, $AntI_{RSSI}$ and $AntIV_{RSSI}$ represents RSSIs of the two closest receiving antennas.

12. The positioning system of claim 11, wherein the first device obtains the distance between the second device and the first device further according to a gain of one of the closest receiving antennas.

13. The positioning system of claim 11, wherein the first device obtains the distance between the second device and the first device further according to an output power of the second device.

14. The positioning system of claim 11, wherein the first device obtains the distance between the second device and the first device further according to a gain of a transmitting antenna.

\* \* \* \* \*